US012019016B2

United States Patent
Haney et al.

(10) Patent No.: US 12,019,016 B2
(45) Date of Patent: *Jun. 25, 2024

(54) LIGHT SCATTERING DETECTORS AND SAMPLE CELLS FOR THE SAME

(71) Applicant: TOSOH CORPORATION, Yamaguchi (JP)

(72) Inventors: Max Haney, Cleveland, OH (US); Michael P. Murphy, Conroe, TX (US)

(73) Assignee: TOSOH CORPORATION, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,494

(22) Filed: Dec. 15, 2021

(65) Prior Publication Data
US 2022/0107270 A1    Apr. 7, 2022

Related U.S. Application Data

(63) Continuation of application No. 16/758,677, filed as application No. PCT/US2019/012090 on Jan. 2, 2019, now Pat. No. 11,226,287.

(51) Int. Cl.
*G01N 21/53* (2006.01)
*G01N 21/05* (2006.01)
*G01N 21/51* (2006.01)

(52) U.S. Cl.
CPC ............. *G01N 21/53* (2013.01); *G01N 21/05* (2013.01); *G01N 2021/513* (2013.01)

(58) Field of Classification Search
CPC ... G01N 2021/4707; G01N 2021/4709; G01N 2021/4726; G01N 2021/513; G01N 21/05;
(Continued)

(56) References Cited

U.S. PATENT DOCUMENTS 3,826,577 A    7/1974   Irwin
3,843,268 A    10/1974  Kaye
(Continued)

FOREIGN PATENT DOCUMENTS

CH         653132 A5    12/1985
CN      101118210 A     2/2008
(Continued)

OTHER PUBLICATIONS

International Search Report and Written Opinion dated Mar. 15, 2019 for International Application No. PCT/US2019/012090 (Authorized officer, Shane Thomas), 11 pages.
(Continued)

*Primary Examiner* — Tri T Ton
(74) *Attorney, Agent, or Firm* — MH2 TECHNOLOGY LAW GROUP, LLP

(57) ABSTRACT

Sample cells, light scattering detectors utilizing the sample cells, and methods for using the same are provided. The sample cell may include a body defining a flowpath extending axially therethrough. The flowpath may include a cylindrical inner section interposed between a first outer section and a second outer section. The first outer section may be frustoconical. A first end portion of the first outer section may be in direct fluid communication with the inner section and may have a cross-sectional area relatively smaller than a cross-sectional area at a second end portion thereof. The body may further define an inlet in direct fluid communication with the inner section. The inlet may be configured to direct a sample to the inner section of the flowpath.

18 Claims, 3 Drawing Sheets

(58) Field of Classification Search
CPC ........ G01N 21/51; G01N 21/53; G01N 30/74;
B21B 1/22; B21B 3/02; B21B 45/06;
C21D 2211/001; C21D 2211/005; C21D
9/46; C22C 38/00; C22C 38/001; C22C
38/06; C22C 38/34; C22C 38/42; C22C
38/44; C22C 38/46; C22C 38/48; C22C
38/50; C22C 38/52; C22C 38/58; C23G
1/08; C23G 5/00
USPC .................................. 356/335–343, 432–444
See application file for complete search history.

(56) References Cited

U.S. PATENT DOCUMENTS

| | | | |
|---|---|---|---|
| 4,463,598 | A | 8/1984 | Haney |
| 4,616,927 | A | 10/1986 | Phillips et al. |
| 4,747,687 | A | 5/1988 | Hoppe et al. |
| 4,790,653 | A | 12/1988 | North, Jr. |
| 4,844,611 | A | 7/1989 | Imahashi et al. |
| 4,907,884 | A | 3/1990 | Wyatt et al. |
| 5,040,890 | A | 8/1991 | North, Jr. |
| 5,129,723 | A | 7/1992 | Howie et al. |
| 6,064,945 | A | 5/2000 | Gorenstein et al. |
| 6,229,146 | B1 | 5/2001 | Cochran et al. |
| 7,782,459 | B2 | 8/2010 | Holve |
| 7,982,875 | B2 | 7/2011 | Trainoff |
| 10,209,176 | B2 | 2/2019 | Proskurowski et al. |
| 10,935,479 | B2 | 3/2021 | Frese |
| 11,150,175 | B2 | 10/2021 | Haney et al. |
| 11,226,287 | B2 * | 1/2022 | Haney ................ G01N 21/53 |
| 11,674,880 | B2 | 6/2023 | Haney et al. |
| 2008/0285032 | A1 | 11/2008 | Ohkubo |
| 2009/0079981 | A1 | 3/2009 | Holve |
| 2011/0235030 | A1 | 9/2011 | Champseix et al. |
| 2012/0257192 | A1 | 10/2012 | Jiang |
| 2013/0308121 | A1 | 11/2013 | Some et al. |
| 2014/0028998 | A1 | 1/2014 | Kaye et al. |
| 2016/0011098 | A1 * | 1/2016 | Graham ............ G01N 15/1434 156/196 |
| 2016/0167061 | A1 | 6/2016 | McNaughton et al. |
| 2017/0362304 | A1 | 12/2017 | Fukuda et al. |
| 2018/0180523 | A1 | 6/2018 | Frese |
| 2019/0234852 | A1 | 8/2019 | Scullion et al. |
| 2021/0223160 | A1 | 7/2021 | Haney et al. |
| 2021/0223172 | A1 | 7/2021 | Haney et al. |
| 2021/0404941 | A1 | 12/2021 | Haney et al. |
| 2023/0273109 | A1 | 8/2023 | Haney et al. |

FOREIGN PATENT DOCUMENTS

| | | |
|---|---|---|
| CN | 204666513 U | 9/2015 |
| CN | 105277472 A | 1/2016 |
| CN | 107076670 A | 8/2017 |
| CN | 108367256 A | 8/2018 |
| CN | 108603825 A | 9/2018 |
| DE | 3630292 C1 | 2/1988 |
| EP | 1 182 443 A2 | 2/2002 |
| JP | 49-90584 A | 8/1974 |
| JP | 49-105585 A | 10/1974 |
| JP | S63198867 A | 8/1988 |
| JP | S63305233 A | 12/1988 |
| JP | H03109049 U | 11/1991 |
| JP | H08271509 A | 10/1996 |
| WO | 2002077671 A2 | 10/2002 |
| WO | 2012/137750 A1 | 10/2012 |
| WO | 2018007328 A1 | 1/2018 |
| WO | 2018/069024 A1 | 4/2018 |

OTHER PUBLICATIONS

International Search Report and Written Opinion dated Mar. 22, 2019 for International Application No. PCT/US2019/012095 (Authorized officer, Shane Thomas), 10 pages.

Extended Search Report dated Apr. 26, 2021 for corresponding European Application No. 19853280.6, 8 pages.

Extended Search Report dated Jun. 11, 2021 for European Application No. 19853281.4, 6 pages.

Liu et al., "Determination of molecular weight and molecular sizes of polymers by high temperature gel permeation chromatography with a static and dynamic laser light scattering detector", Polymer, 2003, vol. 44, No. 23, pp. 7209-7220.

Regina A Murphy, Static and dynamic light scattering of biological maromoleules: what can we learn?, Current Opinion in Biotechnology, 1997, vol. 8, No. 1, pp. 25-30.

Sloot et al., "Elastic light scattering from nucleated blood cells: rapid numerical analysis", Applied Optics, 1986, vol. 25, No. 19, pp. 3559-3565.

* cited by examiner

LIGHT SCATTERING DETECTORS AND SAMPLE CELLS FOR THE SAME

This application is a Continuation of U.S. application Ser. No. 16/758,677 (Allowed) filed 23 Apr. 2020, which is a U.S. National Stage application of PCT/US2019/012090 filed 2 Jan. 2019, the entire disclosure of which is incorporated herein by reference.

BACKGROUND

Conventional light scattering detectors are often utilized in conjunction with chromatographic techniques to determine one or more physical attributes or characteristics of various molecules or solutes suspended in solutions. For example, light scattering detectors are often utilized with gel permeation chromatography (GPC) to determine a molecular weight and a radius of gyration of various polymers. In light scattering detectors, a sample or effluent containing molecules (e.g., polymers) is flowed through a sample cell from an inlet to an outlet disposed at opposing ends thereof. As the effluent is flowed through the sample cell, the effluent is illuminated by a collimated beam of light (e.g., laser). The interaction of the beam of light and the polymers of the effluent produces scattered light. The scattered light is then measured and analyzed for varying attributes, such as intensity and angle, to determine the physical characteristics of the polymers.

While conventional light scattering detectors have proven to be effective for determining the physical attributes of a wide variety of molecules, conventional light scattering detectors are limited in their ability to analyze small molecules. For example, conventional light scattering detectors often lack the sensitivity and/or resolution to measure Rg of molecules having a radius of gyration of less than about 10 nm. In view of the foregoing, conventional light scattering detectors often incorporate lasers having relatively greater power or energy to increase the sensitivity of the detectors. Incorporating lasers with greater power, however, is cost prohibitive and often requires larger instruments due to the relatively larger footprint of the lasers. Alternatively, the volume of the sample cells in conventional light scattering detectors can been increased to increase the intensity of scattered light. Increasing the volume of conventional sample cells, however, leads to excessive peak broadening.

What is needed, then, are improved light scattering detectors and sample cells thereof, and methods for increasing the sensitivity and/or resolution of the light scattering detectors without increasing peak broadening.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a sample cell for a light scattering detector. The sample cell may include a body defining a flowpath extending axially therethrough. The flowpath may comprise a cylindrical inner section interposed between a first outer section and a second outer section. The first outer section may be frustoconical, and a first end portion of the first outer section may be in direct fluid communication with the inner section and may have a cross-sectional area relatively less than a cross-sectional area at a second end portion thereof. The body may further define an inlet in direct fluid communication with the inner section and configured to direct a sample to the inner section of the flowpath.

In at least one implementation, the second outer section is frustoconical, and a first end portion of the second outer section is in direct fluid communication with the inner section and has a cross-sectional area relatively less than a cross-sectional area at a second end portion thereof.

In at least one implementation, the body further defines a first outlet and a second outlet extending therethrough, wherein the first outlet and the second outlet are configured to fluidly couple the respective second end portions of the first and second outer sections with a waste line.

In at least one implementation, the body defines a first recess extending axially therethrough, the first recess in fluid communication with the first outer section and configured to receive a first lens of the light scattering detector.

In at least one implementation, the body defines a second recess extending axially therethrough, the second recess in fluid communication with the second outer section and configured to receive a second lens of the light scattering detector.

In at least one implementation, the body defines an aperture extending radially therethrough, wherein the aperture is in direct fluid communication with the inner section of the flowpath.

In at least one implementation, the sample cell further comprises an optically transparent material disposed in the aperture.

The foregoing and/or other aspects and utilities embodied in the present disclosure may be achieved by providing a light scattering detector. The light scattering detector may include: a laser configured to emit a beam of light; a sample cell comprising a body defining a flowpath extending therethrough, the flowpath having a centerline aligned with the beam of light, the flowpath comprising a cylindrical inner section interposed between a first outer section and a second outer section. The first outer section is frustoconical, and a first end portion of the first outer section is in direct fluid communication with the inner section and has a cross-sectional area relatively less than a cross-sectional area at a second end portion thereof. The body further defines an inlet in direct fluid communication with the inner section and configured to direct a sample to the inner section of the flowpath. The light scattering detector may also include at least one detector operably coupled with the sample cell and configured to receive scattered light emitted from the sample cell.

In at least one implementation, the second outer section is frustoconical, and a first end portion of the second outer section is in direct fluid communication with the inner section and has a cross-sectional area relatively less than a cross-sectional area at a second end portion thereof.

In at least one implementation, the light scattering detector may include a first lens and a second lens, the first lens disposed adjacent the first outer section of the flowpath, and the second lens disposed adjacent the second outer section of the flowpath.

In at least one implementation, the light scattering detector further includes a first mirror and a first detector, the first mirror disposed proximal the first lens and configured to reflect forward scattered light from the sample cell to the first detector.

In at least one implementation, the light scattering detector may further include a second mirror and a second detector, the second mirror disposed proximal the second lens and configured to reflect back scattered light from the sample cell to the second detector.

In at least one implementation, the body defines an aperture extending radially therethrough, wherein the aperture is in direct fluid communication with the inner section of the flowpath.

In at least one implementation, the light scattering detector may further include a third detector disposed in the aperture and configured to receive right angle scattered light from the sample cell.

In at least one implementation, the body further defines a first outlet and a second outlet extending therethrough, wherein the first outlet and the second outlet are configured to fluidly couple the respective second end portions of the first and second outer sections with a waste line.

The foregoing and/or other aspects and utilities embodied in the present disclosure may be achieved by providing a method of using any one of the light scattering detectors disclosed herein. The method may include emitting the beam of light from the laser to and through the flowpath of the sample cell, flowing a sample to the inner section of the flowpath via the inlet of the sample cell, flowing a first portion of the sample from the inner section to and through the first frustoconical outer section from the first end portion to the second end portion thereof, and flowing the first portion of the sample from the second end portion of the first frustoconical outer section to the waste line via the first outlet.

In at least one implementation, the method may further include flowing a second portion of the sample from the inner section to and through the second frustoconical outer section from the first end portion to the second end portion thereof, and flowing the second portion of the sample from the second end portion of the second frustoconical outer section to the waste line via the second outlet.

In at least one implementation, the method may also include directing the forward scattered light emitted from the flowpath to the first detector with the first mirror.

In at least one implementation, the method may further include directing the back scattered light emitted from the flowpath to the second detector with the second mirror.

In at least one implementation, the method may include directing the right angle scattered light emitted from the flowpath to the third detector.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The accompanying drawings, which are incorporated in and constitute a part of this specification, illustrate varying implementations of the present disclosure. These and/or other aspects and advantages in the implementations of the disclosure will become apparent and more readily appreciated from the following description of the various implementations, taken in conjunction with the accompanying drawings. It should be noted that some details of the drawings have been simplified and are drawn to facilitate understanding of the present disclosure rather than to maintain strict structural accuracy, detail, and scale. These drawings/figures are intended to be explanatory and not restrictive.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

All references cited herein are hereby incorporated by reference in their entireties. In the event of a conflict in a definition in the present disclosure and that of a cited reference, the present disclosure controls.

As used herein, the term or expression "sensitivity" may refer to the ratio of signal to noise. It should be appreciated by one having ordinary skill in the art that increasing laser power does not necessarily improve the sensitivity.

Figure 1A:
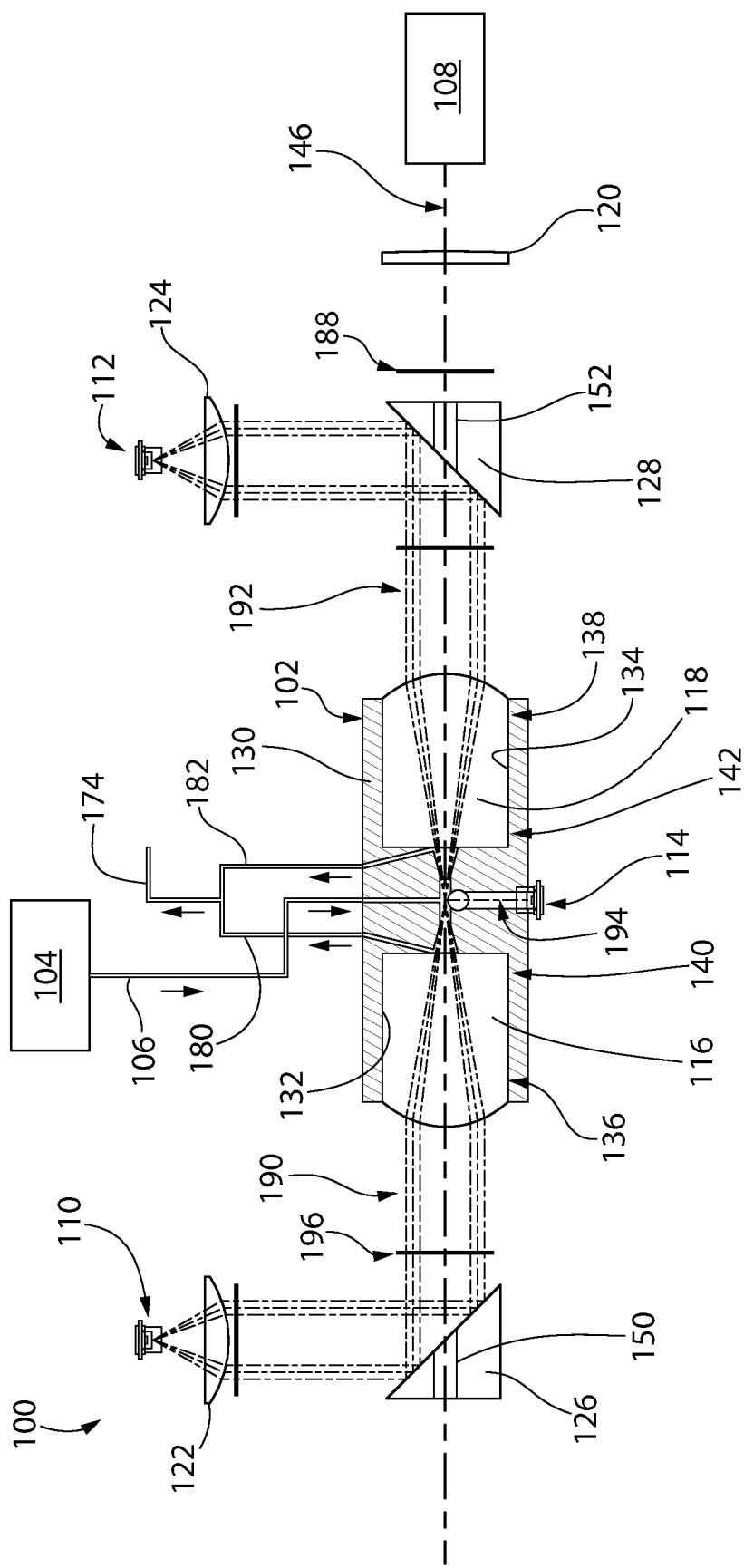
FIG. 1A illustrates a schematic view of an exemplary light scattering detector including an exemplary sample cell, according to one or more implementations disclosed.

FIG. 1A illustrates a schematic view of an exemplary light scattering detector (LSD) 100 including an exemplary sample cell 102, according to one or more implementations.

The LSD 100 may be operably coupled with a sample source or device 104, and capable of or configured to receive a sample or effluent therefrom. For example, as illustrated in FIG. 1A, the LSD 100 may be fluidly coupled with the sample source or device 104 via line 106 and configured to receive the effluent therefrom. Illustrative sample sources or devices 104 may include, but are not limited to, a chromatography instrument capable of or configured to separate one or more analytes of a sample or eluent from one another. For example, the sample source or device 104 may be a liquid chromatography instrument capable of or configured to separate the analytes of the eluent from one another based on their respective charges (e.g., ion exchange chromatography), sizes (e.g., size-exclusion or gel permeation chromatography), or the like. In an exemplary implementation, the LSD 100 is operably coupled with a liquid chromatography instrument configured to separate the analytes from one another based on their respective sizes. For example, the LSD 100 is operably coupled with a liquid chromatography instrument including gel permeation chromatography columns.

The LSD 100 may include the exemplary sample cell 102, a collimated beam of light such, such as a laser 108, and one or more detectors 110, 112, 114 (three are shown) operably coupled with one another. The detectors 110, 112, 114 may be any suitable detector capable of or configured to receive analyte scattered light. For example, any one or more of the detectors 110, 112, 114 may be a photo-detector, such as a silicon photo-detector. The LSD 100 may include one or more lenses 116, 118, 120, 122, 124 (five are shown) capable of or configured to refract, focus, attenuate, and/or collect light transmitted through the LSD 100, and one or more mirrors 126, 128 (two are shown) capable of or configured to reflect or redirect the light transmitted through the LSD 100.

Figure 1B:
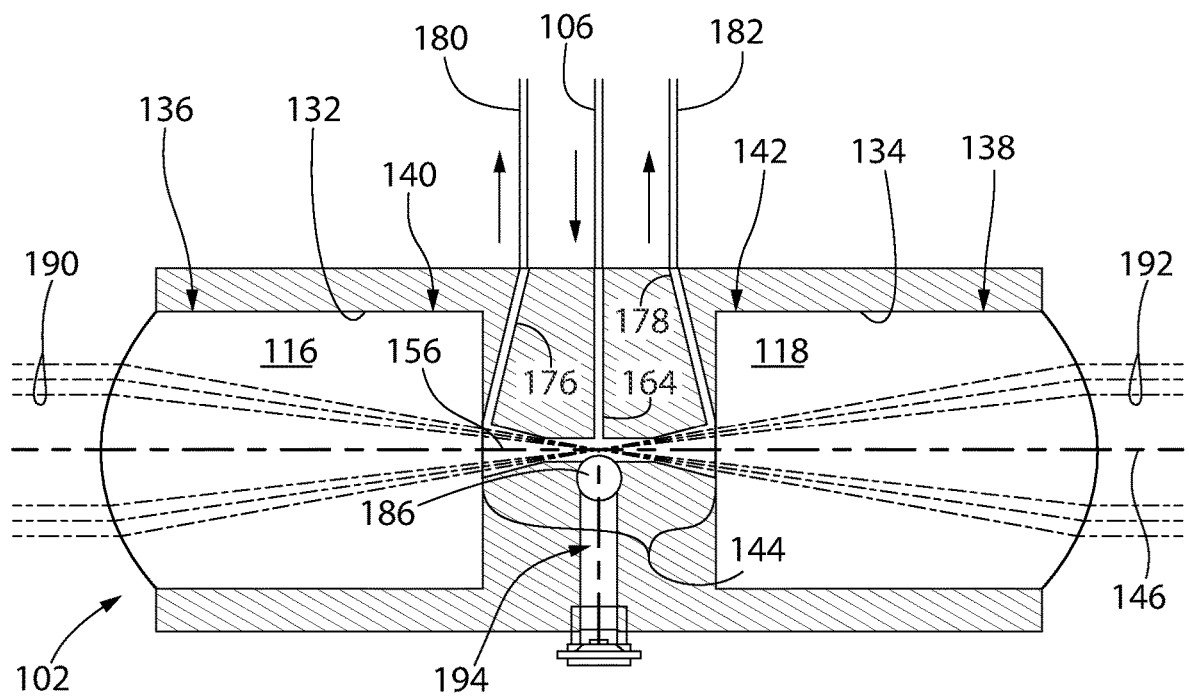
FIG. 1B illustrates a schematic view of the exemplary sample cell of FIG. 1A, according to one or more implementations disclosed.

In at least one implementation, a first lens 116 and a second lens 118 may be disposed on opposing sides of the sample cell 102 and configured to refract, focus, attenuate, and/or collect light transmitted therethrough. In another implementation, a body 130 of the sample cell 102 may define recesses 132, 134 configured to receive the first and second lenses 116, 118. For example, as illustrated in FIG. 1A and further illustrated in detail in FIG. 1B, the body 130 of the sample cell 102 may define a first recess 132 and a second recess 134 extending longitudinally or axially therethrough, and configured to receive the first lens 116 and the second lens 118, respectively. As illustrated in FIGS. 1A and 1B, each of the first and second lenses 116, 118 may define a convex surface along respective first or outer end portions 136, 138 thereof. While the first end portions 136, 138 of the first and second lenses 116, 118 are illustrated as defining convex surfaces, it should be appreciated that any one of the respective first end portions 136, 138 of the first and second lenses 116, 118 may alternatively define a flat surface. As further illustrated in FIG. 1A, each of the first and second lenses 116, 118 may define a flat surface along respective second or inner end portions 140, 142 thereof. As further described herein, the respective second end portions 140, 142 of the first and second lenses 116, 118 may seal and/or at least partially define a channel or flowpath 144 extending through the sample cell 102.

The laser 108 may be any suitable laser capable of or configured to provide a beam of light 146 having sufficient wavelength and/or power. For example, the laser 108 may be a diode laser, a solid state laser, or the like. The laser 108 may be configured to emit the beam of light 146 through the sample cell 102. For example, as illustrated in FIG. 1A, the laser 108 may be arranged or disposed about the LSD 100 such that the beam of light 146 emitted therefrom is transmitted through the sample cell 102. As further illustrated in FIG. 1A, a third lens 120 may be interposed between the sample cell 102 and the laser 108 and configured to focus the beam of light 146 directed to and through the sample cell 102.

In at least one implementation, at least one of the mirrors 126, 128 may be associated with a respective detector 110, 112, and configured to reflect or redirect the light (e.g., scattered light or analyte scattered light) towards the respective detector 110, 112. For example, as illustrated in FIG. 1A, a first mirror 126 may be disposed proximal the first lens 116 and configured to reflect at least a portion of the light from the first lens 116 towards a first detector 110. In another example, a second mirror 128 may be disposed proximal the second lens 118 and/or interposed between the second and third lenses 118, 120, and configured to reflect at least a portion of the light from the second lens 118 towards a second detector 112. In at least one implementation, one or more lenses 122, 124 may be interposed between the first and second mirrors 126, 128 and the first and second detectors 110, 112 to focus, refract, or otherwise direct the light from the mirrors 126, 128 to the detectors 110, 112. For example, as illustrated in FIG. 1A, a fourth lens 122 may be interposed between the first detector 110 and the first mirror 126, and a fifth lens 124 may be interposed between the second detector 112 and the second mirror 128.

In at least one implementation, at least one of the detectors 110, 112, 114 may be configured to receive the light (e.g., scattered light or analyte scattered light) from the sample cell 102 without the aid or reflection of one of the mirrors 126, 128. For example, as illustrated in FIGS. 1A and 1B, a third detector 114 may be disposed adjacent to or coupled with the sample cell 102 and configured to receive the light (e.g., scattered light) from the sample cell 102 at an angle of about 90° with respect to the beam of light 146. As further discussed herein, an optically transparent material or a sixth lens 186 may be configured to refract or direct the scattered light toward the third detector 114.

As illustrated in FIG. 1A, at least one of the sample cell 102, the first, second, and third lenses 116, 118, 120, and the first and second mirrors 126, 128 may be disposed parallel, coaxial, or otherwise aligned with one another along a direction of the beam of light 146 emitted by the laser 108. As further illustrated in FIG. 1A, each of the first and second detectors 110, 112 may be disposed or positioned to receive light (e.g., scattered light or analyte scattered light) from the respective mirrors 126, 128 in a direction generally perpendicular to the beam of light 146 emitted by the laser 108. Each of the first and second mirrors 126, 128 may define a respective bore or pathway 150, 152 extending therethrough. For example, the first mirror 126 may define a bore 150 extending therethrough in a direction parallel, coaxial, or otherwise aligned with the beam of light 146. Similarly, the second mirror 128 may define a bore 152 extending therethrough in the direction parallel, coaxial, or otherwise aligned with the beam of light 146. It should be appreciated that the bores 150, 152 extending through the respective mirrors 126, 128 may allow the beam of light 146 emitted from the laser 108 to be transmitted through the first and second mirrors 126, 128 to thereby prevent the beam of light 146 from being reflected towards the first and second detectors 110, 112.

Figure 1C:
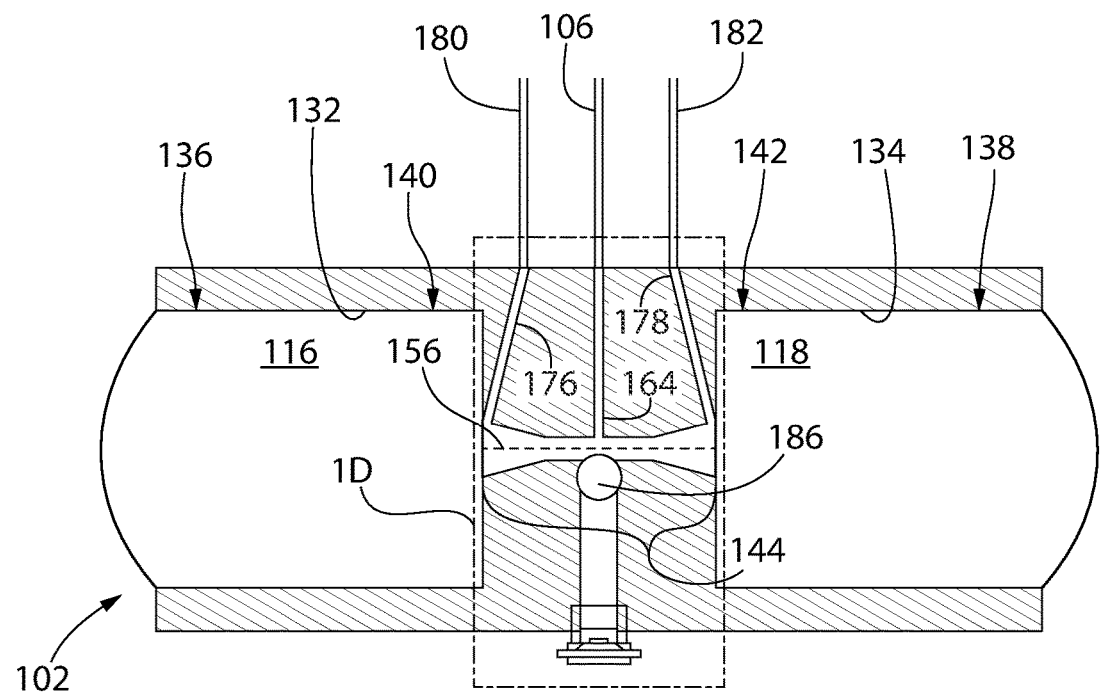
FIG. 1C illustrates the schematic view of the exemplary sample cell of FIG. 1A without the analyte scattered light, according to one or more implementations disclosed.
Figure 1D:
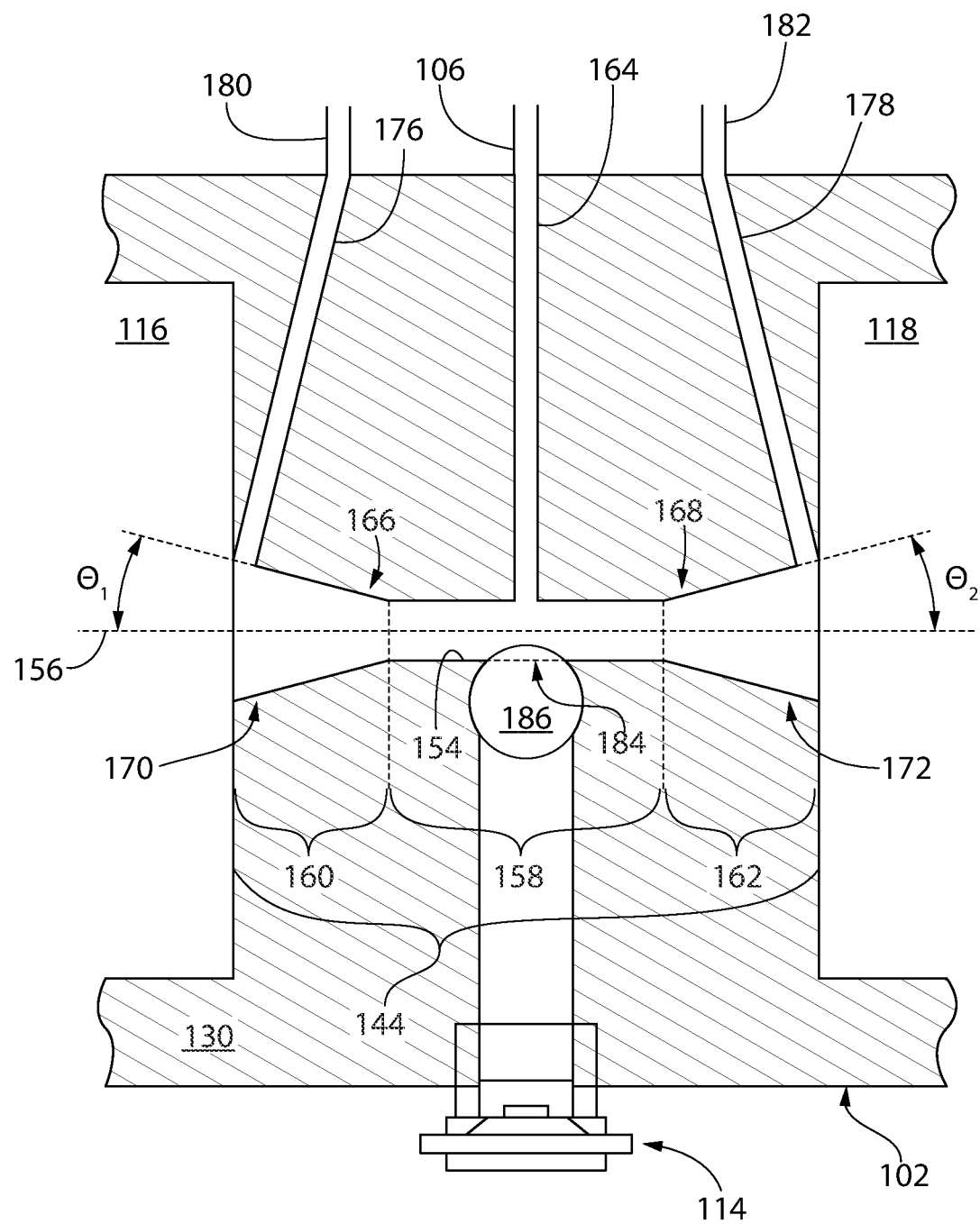
FIG. 1D illustrates an enlarged view of the portion of the sample cell indicated by the box labeled 1D in FIG. 1C, according to one or more implementations disclosed.

FIG. 1D illustrates an enlarged view of the portion of the exemplary LSD 100 indicated by the box labeled 1D of FIG. 1C, according to one or more implementations. As previously discussed, the body 130 of the sample cell 102 may at least partially define the channel or flowpath 144 extending therethrough. For example, as illustrated in FIG. 1D, an inner surface 154 of the body 130 may at least partially define the flowpath 144 extending therethrough. The flowpath 144 may define a volume of the sample cell 102. The flowpath 144 may include a central axis or centerline 156 extending therethrough and configured to define a general orientation of the flowpath 144. As illustrated in FIG. 1B, the flowpath 144 and the central axis 156 thereof may be aligned or coaxial to the beam of light 146 emitted from the laser 108. The flowpath 144 of the sample cell 102 may be interposed between the first and second lenses 116, 118. In at least one implementation, the first and second lenses 116, 118 may sealingly engage the body 130 of the sample cell 102 on opposing sides thereof to thereby prevent a flow of the sample or effluent from the flowpath 144 via the interface between the body 130 and the respective first and second lenses 116, 118. In another implementation, a seal (e.g., gasket, O-ring, etc.) (not shown) may be disposed between the body 130 and the first and second lenses 116, 118 to provide a fluid tight seal therebetween.

The flowpath 144 may include an inner section 158 and two outer sections 160, 162 disposed along the centerline 156 thereof. As illustrated in FIG. 1D, the inner section 158 may be interposed between the two outer sections 160, 162. The inner section 158 may be fluidly coupled with and configured to receive a sample or effluent from the sample source 104. For example, as illustrated in FIG. 1D with continued referenced to FIG. 1A, the body 130 of the sample cell 102 may define an inlet 164 extending therethrough and configured to fluidly couple the sample source 104 with the inner section 158 via line 106. In a preferred implementation, the inlet 164 is configured such that the sample from the sample source 104 is directed to the middle or center of the flowpath 144 or the inner section 158 thereof.

In at least one implementation, the inner section 158 may be cylindrical or define a cylindrical volume, and may have a circular cross-sectional profile. It should be appreciated, however, that the cross-sectional profile may be represented by any suitable shape and/or size. For example, the cross-sectional profile may be elliptical, rectangular, such as a rounded rectangle, or the like. The inner section 158 may have any suitable dimension. In at one implementation, the inner section 158 may have a length extending between the two outer sections 160, 162 of from about 4 mm to about 12 mm or greater. For example, the inner section 158 may have a length of from about 4 mm, about 5 mm, about 6 mm, about 7 mm, or about 7.5 mm to about 8.5 mm, about 9 mm, about 10 mm, about 11 mm, about 12 mm, or greater. In another example, the inner section 158 may have a length of from about 4 mm to about 12 mm, about 5 mm to about 11 mm, about 6 mm to about 10 mm, about 7 mm to about 9 mm, or about 7.5 mm to about 8.5 mm. In a preferred implementation, the inner section 158 may have a length of from about 7 mm to about 9 mm, preferably about 7.5 mm to about 8.5 mm, more preferably about 8 mm. In at least one implementation, the inner section 158 may have a diameter of from about 1.2 mm to about 2.0 mm or greater. For example, the inner section 158 may have a diameter of from about 1.2 mm, about 1.3 mm, about 1.4 mm, about 1.5 mm, or about 1.55 mm to about 1.65 mm, about 1.7 mm, about 1.8 mm, about 1.9 mm, about 2.0 mm, or greater. In another example, the inner section 158 may have a diameter of from about 1.2 mm to about 2.0 mm, about 1.3 mm to about 1.9 mm, about 1.4 mm to about 1.8 mm, about 1.5 mm to about 1.7 mm, or about 1.55 mm to about 1.65 mm. In a preferred implementation, the inner section 158 may have a diameter of from about 1.5 mm to about 1.7 mm, preferably about 1.55 mm to about 1.65 mm, more preferably about 1.6 mm.

The outer sections 160, 162 of the flowpath 144 may be fluidly coupled with the inner section 158 and configured to receive the sample or effluent therefrom. In at least one implementation, at least one of the first and second outer sections 160, 162 may be cylindrical or define a cylindrical volume, and may have a circular cross-sectional profile. For example, at least one of the first and second outer sections 160, 162 may be sized and shaped similar to the inner section 158 of FIG. 1D. In another implementation, at least one of the first and second outer sections 160, 162 may be conical or frustoconical such that a cross-sectional area at a respective first end portion or inlet 166, 168 thereof may be relatively less than a cross-sectional area at a respective second end portion or outlet 170, 172 thereof. In a preferred implementation, the first and second outer sections 160, 162 may both be frustoconical or define a frustum, where the respective first end portions or inlets 166, 168 are configured to receive the sample from the inner section 158, and the respective second end portions or outlets 170, 172 are configured to deliver the sample to a waste line 174 (see FIG. 1A).

The inner surface 154 of the body 130 may at least partially define respective taper angles ($\theta_1$, $\theta_2$) of the first outer section 160 and the second outer section 162. For example, as illustrated in FIG. 1D, the portion of the inner surface 154 defining or forming the first outer section 160 of the flowpath 144 and the centerline 156 of the flowpath 144 may define the respective taper angle ($\theta_1$) of the first outer section 160. In another example, the portion of the inner surface 154 defining or forming the second outer section 162 of the flowpath 144 and the centerline 156 of the flowpath 144 may define the respective taper angle ($\theta_2$) of the second outer section 162. The first and second outer sections 160, 162 may have any taper angles ($\theta_1$, $\theta_2$) capable of or configured to allow the LSD 100 and the detectors 110, 112, 114 thereof to receive scattered light at any desired angle. While FIG. 1D illustrates the taper angles ($\theta_1$, $\theta_2$) of the first and second outer sections 160, 162 to be relatively equal to one another, it should be appreciated that one of the taper angles ($\theta_1$, $\theta_2$) may be relatively greater than the other. It should further be appreciated that than any one or more attributes (e.g., length, taper angle, diameter, shape, size, etc.) of the first and second outer sections 160, 162 may be different. In a preferred implementation, the attributes (e.g., length, taper angle, diameter, shape, size, etc.) of the first outer section 160 and the second outer section 162 are the same or substantially the same.

Each of the outer sections 160, 162 may be fluidly coupled with the waste line 174. For example, as illustrated in FIGS. 1A and 1D, the body 130 may define a first outlet 176 and a second outlet 178 extending therethrough and configured to fluidly couple the first outer section 160 and the second outer section 162 with the waste line 174 via a first outlet line 180 and a second outlet line 182, respectively. As further illustrated in FIG. 1D, the first and second outlets 176, 178 may be fluidly coupled with the respective second end portions 170, 172 of the outer sections 160, 162. It should be appreciated that the orientation (e.g., circumferential orientation) or location of the inlet 164 and the first and second outlets 176, 178 may vary. For example, the inlet 164 may be circumferentially aligned with at least one of the first and second outlets 176, 178. In another example, the inlet 164 may be circumferentially offset from at least one of the first and second outlets 176, 178. In yet another example, the first and second outlets 176, 178 may be circumferentially aligned with one another or circumferentially offset from one another.

As illustrated in FIG. 1D, the body 130 of the sample cell 102 may define an aperture 184 extending through at least a portion thereof, and configured to allow light (e.g., scattered light) from the inner section 158 to be directed or transmitted to the third detector 114. The aperture 184 may be sealed with an optically transparent material 186, such as a quartz crystal, to thereby allow the light from the inner section 158 to be directed to the third detector 114. In an exemplary implementation, illustrated in FIGS. 1B and 1D, the optically transparent material 186 may be shaped to refract a portion of the light towards the third detector 114. For example, the optically transparent material 186 may be the sixth lens (e.g., a ball lens) configured to seal the aperture 184 and at least partially refract the light towards the third detector 114.

The body 130 may include or be fabricated from any suitable material. The body 130 may be configured such that the inner surface 154 thereof attenuates the reflection of light. For example, the body 130 may be fabricated from a non-reflective material. In another example, the body 130 may be at least partially fabricated from a reflective material and at least partially coated with a non-reflective material. In at least one implementation, the sample cell 102 may be fabricated from quartz, such as black quartz. In an exemplary implementation, the body 130 may include or be fabricated from a polymer. Illustrative polymers may be or include, but are not limited to, polyolefin-based polymers, acryl-based polymers, polyurethane-based polymers, ether-based polymers, polyester-based polymers, polyamide-based polymers, formaldehyde-based polymers, silicon-based polymers, any copolymers thereof, or any combination thereof. For example, the polymers may include, but are not limited to, poly(ether ether ketone) (PEEK), TORLON®, polyamide-imides, polyethylene (PE), polyvinyl fluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide, polyimide, any copolymers thereof, or any combination thereof. The polymers may be or include, but are not limited to, elastomers or elastomeric materials, synthetic rubber, or the like. Illustrative elastomeric materials and synthetic rubbers may include, but are not limited to, VITON®, nitrile, polybutadiene, acrylonitrile, polyisoprene, neoprene, butyl rubber, chloroprene, polysiloxane, styrene-butadiene rubber, hydrin rubber, silicone rubber, ethylene-propylene-diene terpolymers, any copolymers thereof, or any combination thereof.

In an exemplary operation of the LSD 100, with continued reference to FIGS. 1A-1D, the sample source 104 (e.g., a liquid chromatograph including a gel permeation chromatography column) may inject or direct the sample or effluent (e.g., dilute polymer solution) to and through the flowpath 144 of the sample cell 102 via line 106 and the inlet 164. As illustrated in FIG. 1D, the sample from the sample source 104 may be directed toward a center or middle of the flowpath 144 or the inner section 158 of the sample cell 102. As the sample flows to the center of the inner section 158, the flow of the of sample may split such that a first portion of the sample flows towards the first outer section 160, and a second portion of the sample flows towards the second outer section 162. The portions of the sample in the first and second outer sections 160, 162 may then be directed out of the sample cell 102 and to the waste line 174 via the first and second outlets 176, 178 and the first and second outlet lines 180, 182, respectively.

The rate of flow of the sample through the first outer section 160 and the second outer section 162 may be modified or adjusted (i.e., increased or decreased) by adjusting the respective lengths of the first outlet line 180 and the second outlet line 182. In at least one implementation, a rate of flow of the first and second portions of the sample through the first and second outer sections 160, 162 may be the same or substantially the same. For example, the rate of flow of the first portion of the sample through the first outer section 160 is the same or substantially the same as the rate of flow of the second portion of the sample through the second outer section 162. In another implementation, the rate of flow of the first and second portions of the sample through the first and second outer sections 160, 162 may be different. It should be appreciated, however, that a time correction may be applied if the rate of flow is different through the first and second outer sections 160, 162.

As the sample flows through the flowpath 144 of the sample cell 102, the laser 108 may emit the beam of light 146 along and through the centerline 156 of the flowpath 144 via the bore 152 of the second mirror 128. In at least one implementation, illustrated in FIG. 1A, the beam of light 146 may be transmitted through the third lens 120, which may at least partially focus the beam of light 146 along the centerline 156 of the flowpath 144. In another implementation, the third lens 120 may be omitted. In at least one implementation, an optional screen or diaphragm 188 may be disposed between the laser 108 and the sample cell 102, and configured to "cleanup," segregate, or otherwise filter stray light (e.g., halo of light) from the beam of light 146. For example, the diaphragm 188 may define a hole or aperture (e.g., adjustable aperture/iris) capable of or configured to filter out stray light from the beam of light 146.

At least a portion of the beam of light 146 may travel or be transmitted from the laser 108 to and through the sample cell 102, the first lens 116, the bore 152 of the second mirror 128, and/or an optional diaphragm 196. For example, at least a portion of the beam of light 146 may be transmitted unhindered or without interacting with any of the analytes in the sample from the laser 108 to and through the sample cell 102, the first lens 116, the bore 152 of the second mirror 128, and/or the optional diaphragm 188. The remaining portion of the beam of light 146 transmitted through the flowpath 144 may interact or otherwise contact analytes suspended, dispersed, or otherwise disposed in the sample and/or flowing through the sample cell 102.

The contact between the beam of light 146 and the analytes in the sample may generate or induce scattered light or analyte scattered beams 190, 192, 194 (see FIGS. 1A and 1B). For example, contact between the beam of light 146 and the analytes contained in the sample or flowing through the flowpath 144 of the sample cell 102 may generate forward and back analyte scattered beams 190, 192. In another example, contact between the beam of light 146 and the analytes contained in the sample or flowing through the flowpath 144 of the sample cell 102 may generate right angle scattered beams 194 in a direction generally perpendicular to the beam of light 146.

It should be appreciated that the flow of the sample to the center of the flowpath 144 via the inlet 164 allows the sample to interact immediately with the beam of light 146, thereby minimizing peak broadening. For example, flowing the sample directly to the center of the flowpath 144 allows the sample to interact with the beam of light 146 without flowing through at least half the length or volume of the sample cell 102 (e.g., in a lateral or axial direction) and the flowpath 144 thereof. Flowing the sample directly to the center of the flowpath 144 also minimizes the amount of time necessary for the sample to interact with the beam of light 146 and generate the analyte scattered beams 190, 192, 194. It should further be appreciated that one or more components of the LSD 100 are configured such that only light scattered from the center of the flowpath 144 are collected by the detectors 110, 112, 114. For example, at least one of the first lens 116, the first mirror, and the fourth lens 122 may be configured to segregate forward light scattering 190 that originates from the center of the flowpath 144 from forward light scattering 190 that originates from other regions of the flowpath 144, such that the first detector 110 only receives forward light scattering 190 that originates from the center of the flowpath 144. Similarly, at least one of the second lens 116, the second mirror 128, and the fifth lens 124 may be configured to segregate back light scattering 192 that originates from the center of the flowpath 144 from back light scattering 192 that originates from other regions of the flowpath 144, such that the second detector 112 only receives back light scattering 192 that originates from the center of the flowpath 144.

As illustrated in FIG. 1A, the forward analyte scattered beams or forward scattered light 190 may be directed towards the first detector 110 via the first lens 116, the first mirror 126, and the fourth lens 122. At least a portion of the forward scattered light 190 may be at least partially refracted by the convex surface defined along the first end portion 136 of the first lens 116. As illustrated in FIG. 1A, the forward scattered light 190 may be refracted by the convex surface toward the first mirror 126, and the first mirror 126 may reflect the forward scattered light 190 toward the first detector 110 via the fourth lens 122. The fourth lens 122 may collect the forward scattered light 190, and direct and/or focus the forward scattered light 190 toward the first detector 110.

The forward scattered light 190 may be scattered at varying angles of from greater than 0° to less than 90°, relative to the beam of light 146 emitted from the laser 108. For example, the forward scattered light 190 may be scattered at any angle of from greater than 0°, about 5°, about 10°, about 15°, about 20°, about 25°, about 30°, about 35°, about 40°, or about 45° to about 50°, about 55°, about 60°, about 65°, about 70°, about 75°, about 80°, about 85°, or less than 90°. In another example, the forward scattered light 190 may be scattered at any angle of from about 5°, about 6°, about 7°, about 8°, about 9°, or about 9.5° to about 10.5°, about 11°, about 12°, about 13°, about 14°, or about 15°, relative to the beam of light 146 emitted from the laser 108. In yet another example, the forward scattered light 190 may be scattered at an angle of from about 5° to about 15°, about 6° to about 14°, about 7° to about 13°, about 8° to about 12°, about 9° to about 11°, or about 9.5° to about 10.5°. It should be appreciated that the LSD 100 and any component thereof may be configured to receive the forward scattered light 190 scattered at any angle greater than 0° and less than 90°. For example, any one or more attributes (e.g., shape, location, orientation, etc.) of the first detector 110, the first lens 116, the first mirror 126, the fourth lens 122, and/or any additional optional diaphragms may be adjusted, modified, or otherwise configured such that the first detector 110 may receive any of the forward scattered light 190. In a preferred implementation, the LSD 100 and the first detector 110 thereof is configured to receive or collect the forward scattered light 190 at an angle of from about 9° to about 11°, preferably about 9.5° to about 10.5°, and more preferably at an angle of about 10°, relative to the beam of light 146.

As illustrated in FIG. 1A, the back analyte scattered beams or back scattered light 192 may be directed towards the second detector 112 via the second lens 118, the second mirror 128, and the fifth lens 124. At least a portion of the back scattered light 192 may be at least partially refracted by the convex surface of the second lens 118. As illustrated in FIG. 1A, the back scattered light 192 may be refracted by the convex surface toward the second mirror 128, and the second mirror 128 may reflect the back scattered light 192 toward the second detector 112 via the fifth lens 124. The fifth lens 124 may collect the back scattered light 192, and direct and/or focus the back scattered light 192 toward the second detector 112.

The back scattered light 192 may be scattered at varying angles of from greater than 90° to less than 180°, relative to the beam of light 146 emitted from the laser 108. For example, the back scattered light 192 may be scattered at any angle of from greater than 90°, about 95°, about 100°, about 105°, about 110°, about 115°, about 120°, about 125°, about 130°, or about 135° to about 140°, about 145°, about 150°, about 155°, about 160°, about 165°, about 170°, about 175°, or less than 180°. In another example, the back scattered light 192 may be scattered at any angle of from about 165°, about 166°, about 167°, about 168°, about 169°, or about 169.5° to about 170.5°, about 171°, about 172°, about 173°, about 174°, or about 175°, relative to the beam of light 146 emitted from the laser 108. In yet another example, the back scattered light 192 may be scattered at an angle of from about 165° to about 175°, about 166° to about 174°, about 167° to about 173°, about 168° to about 172°, about 169° to about 171°, or about 169.5° to about 170.5°. It should be appreciated that the LSD 100 and any component thereof may be configured to receive the back scattered light 192 scattered at any angle greater than 90° and less than 180°. For example, any one or more attributes (e.g., shape, location, orientation, etc.) of the second detector 112, the second lens 118, the second mirror 128, the fifth lens 124, and/or any additional optional diaphragms may be adjusted, modified, or otherwise configured such that the second detector 112 may receive any of the back scattered light 192. In a preferred implementation, the LSD 100 and the second detector 112 thereof is configured to receive or collect the back scattered light 192 at an angle of from about 169° to about 171°, preferably about 169.5° to about 170.5°, and more preferably at an angle of about 170°, relative to the beam of light 146.

As illustrated in FIG. 1D, the right angle analyte scattered beams or right angle scattered light 194 may be directed towards the third detector 114 via the aperture 184 extending between the third detector 114 and the inner section 158 of the flowpath 144. In at least one implementation, the third detector 114 may be disposed in the aperture 184 adjacent the inner section 158. In another implementation, illustrated in FIG. 1D, the optically transparent material 186 may be disposed in the aperture 184 to seal the inner section 158 of the flowpath 144. The optically transparent material 186 may be any suitable material capable of allowing the right angle scattered light 194 to be transmitted to the third detector 114. The optically transparent material 186 may be shaped to refract at least a portion of the right angle scattered light 194 toward the third detector 114. For example, as previously discussed, the optically transparent material 186 may be a ball lens shaped to refract the right angle scattered light 194 toward the third detector 114.

The right angle scattered light 194 may be scattered in a direction generally perpendicular to the beam of light 146. For example, the right angle scattered light 194 may be scattered at an angle of from about 87°, about 88°, about 89°, about 89.5°, or about 90° to about 90.5°, about 91°, about 92°, or about 93°. In another example, the right angle scattered light 194 may be scattered at an angle of from about 87° to about 93°, about 88° to about 92°, about 89° to about 91°, or about 89.5° to about 90.5°. It should be appreciated that the LSD 100 and any component thereof may be configured to receive the right angle scattered light 194 scattered in a direction generally perpendicular to the beam of light 146. For example, the shape, location, orientation, or any other attributes of the optically transparent material 186 (e.g., the sixth lens) and/or the third detector 114 may be adjusted, modified, or otherwise configured such that the third detector 114 may receive any of the right angle scattered light 194. In a preferred implementation, the LSD 100 and the third detector 114 thereof is configured to receive or collect the right angle scattered light 194 at an angle of from about 89° to about 91°, preferably about 89.5° to about 90.5°, and more preferably at an angle of about 90°, relative to the beam of light 146.

What is claimed is:

1. A sample cell for a light scattering detector, comprising:
   a body defining a flowpath extending therethrough, the flowpath comprising a cylindrical inner section interposed between a first outer section and a second outer section;
   an inlet extending through the body from an outer surface of the body to the inner section, the inlet configured to direct a fluid to a center of the inner section, wherein:
   the first outer section is frustoconical,
   the second outer section is frustoconical,
   the body defines a first recess extending axially therethrough, the first recess in fluid communication with the first outer section and configured to receive a first lens of the light scattering detector,
   the body defines a second recess extending axially therethrough, the second recess in fluid communication with the second outer section and configured to receive a second lens of the light scattering detector,
   the first and the second lenses sealingly engage the body on opposing sides thereof, and
   the first lens is housed by the first recess, and the second lens is housed by the second recess.

2. The sample cell of claim 1, wherein a first end portion of the first outer section is in direct fluid communication with the inner section and has a cross-sectional area relatively less than a cross-sectional area at a second end portion thereof.

3. The sample cell of claim 2, wherein a first end portion of the second outer section is in direct fluid communication with the inner section and has a cross-sectional area relatively less than a cross-sectional area at a second end portion thereof.

4. The sample cell of claim 1, wherein the body further defines a first outlet and a second outlet extending therethrough, wherein the first outlet and the second outlet are configured to fluidly couple respective second end portions of the first and second outer sections with a waste line.

5. The sample cell of claim 1, wherein the body defines an aperture extending radially therethrough, wherein the aperture is in direct fluid communication with the inner section of the flowpath.

6. The sample cell of claim 5, further comprising an optically transparent material disposed in the aperture.

7. A light scattering detector, comprising:
   a laser configured to emit a beam of light;
   the sample cell of claim 1, the flowpath of the sample cell having a centerline aligned with the beam of light of the laser; and
   at least one detector operably coupled with the sample cell and configured to receive scattered light emitted from the sample cell.

8. A method of operating the light scattering detector of claim 7, comprising:
   emitting the beam of light from the laser to and through the flowpath of the sample cell;
   flowing a sample to the inner section of the flowpath via the inlet of the sample cell;
   flowing a first portion of the sample from the inner section to and through the first frustoconical outer section;
   flowing the first portion of the sample from the first frustoconical outer section to a waste line via a first outlet of the sample cell.

9. The method of claim 8, further comprising:
   flowing a second portion of the sample from the inner section to and through the second frustoconical outer section; and
   flowing the second portion of the sample from the second frustoconical outer section to the waste line via a second outlet of the sample cell.

10. The method of claim 8, further comprising directing forward scattered light emitted from the flowpath to a first detector.

11. The method of claim 10, further comprising directing back scattered light emitted from the flowpath to a second detector.

12. The method of claim 11, further comprising directing right angle scattered light emitted from the flowpath to a third detector.

13. A sample cell for a light scattering detector, comprising:
   a body defining a flowpath extending therethrough, the flowpath comprising a cylindrical inner section interposed between a first outer section and a second outer section;
   an inlet extending through the body from an outer surface of the body to the inner section, the inlet configured to direct a fluid to a center of the inner section;
   a first recess extending axially through the body from the outer surface to the first outer section;
   a first lens disposed in the first recess;
   a second recess extending axially through the body from the outer surface to the second outer section;
   a second lens disposed in the second recess;
   an aperture extending radially through the body from the outer surface to the inner section; and
   an optically transparent material disposed in the aperture, wherein the first outer section is frustoconical.

14. The sample cell of claim 13, wherein the second outer section is frustoconical.

15. The sample cell of claim 13, wherein a first end portion of the first outer section is in direct fluid communication with the inner section and has a cross-sectional area relatively less than a cross-sectional area at a second end portion thereof.

16. The sample cell of claim 15, wherein a first end portion of the second outer section is in direct fluid communication with the inner section and has a cross-sectional area relatively less than a cross-sectional area at a second end portion thereof.

17. The sample cell of claim 13, wherein the body further defines a first outlet extending therethrough, the first outlet configured to fluidly couple a second end portion of the first outer section with a waste line.

18. The sample cell of claim 17, wherein the body further defines a second outlet extending therethrough, the second outlet configured to fluidly couple a second end portion of the second outer section with the waste line.

* * * * *